US012149906B2

(12) United States Patent
Casadei et al.

(10) Patent No.: US 12,149,906 B2
(45) Date of Patent: Nov. 19, 2024

(54) PHASE PLUG FOR COMPRESSION DRIVER

(71) Applicant: B&C SPEAKERS NA (USA), LLC, Pompton Plains, NJ (US)

(72) Inventors: Andrea Casadei, Bagno a Ripoli (IT); Valentina Cardinali, Bagno a Ripoli (IT); Phillip Graham, Tucker, GA (US)

(73) Assignee: B&C SPEAKERS NA (USA), LLC, Pompton Plains, NJ (US)

( * ) Notice: Subject to any disclaimer, the term of this patent is extended or adjusted under 35 U.S.C. 154(b) by 0 days.

(21) Appl. No.: 18/389,310

(22) Filed: Nov. 14, 2023

(65) Prior Publication Data

US 2024/0171914 A1 May 23, 2024

Related U.S. Application Data

(60) Provisional application No. 63/426,482, filed on Nov. 18, 2022.

(51) Int. Cl.
*H04R 7/12* (2006.01)

(52) U.S. Cl.
CPC .................................... *H04R 7/12* (2013.01)

(58) Field of Classification Search
CPC .......... H04R 7/12; H04R 1/2807; H04R 1/28; H04R 1/2861; H04R 1/2865; H04R 1/30; H04R 2201/34
USPC ................ 381/338, 337, 339, 343, 340, 341
See application file for complete search history.

(56) References Cited

U.S. PATENT DOCUMENTS

| | | | | |
|---|---|---|---|---|
| 8,989,419 | B2 | 3/2015 | Graber et al. | |
| 2013/0182879 | A1* | 7/2013 | Graber | H04R 1/345 381/343 |
| 2018/0063635 | A1* | 3/2018 | Colich | H04R 1/023 |

* cited by examiner

*Primary Examiner* — Ahmad F. Matar
*Assistant Examiner* — Sabrina Diaz
(74) *Attorney, Agent, or Firm* — CANTOR COLBURN LLP

(57) ABSTRACT

A phase plug for an electrodynamic compression driver, including a compression chamber formed by an oscillating diaphragm and a boundary face of a phase plug assembly adjacent to the diaphragm, a singular acoustic exit defined by a termination of the phase plug assembly, one or more passageways which traverse through the phase plug assembly from the compression chamber to terminate at the acoustic exit, and an axis of rotation, defined within an interior of the phase plug assembly, that extends from the boundary face of the phase plug assembly at the compression chamber to the acoustic exit, where at least one of the passageways expands in cross sectional area between the respective entrance at the boundary face of the phase plug assembly, and the termination at the acoustic exit, while traversing through the phase plug, and where at least one of the internal passageways with the expanding cross section is rotated about the axis of rotation.

6 Claims, 3 Drawing Sheets

PHASE PLUG FOR COMPRESSION DRIVER

CROSS REFERENCE TO RELATED APPLICATION

This U.S. Non-provisional patent application claims the benefit of and priority to U.S. Provisional Patent Application No. 63/426,482, titled Phase Plug for Compression Driver, and filed Nov. 18, 2022, which is incorporated in its entirety by reference herein.

TECHNICAL FIELD

Embodiments relate to electrodynamic compression drivers where the oscillating diaphragm geometry requires path length compensation from the compression chamber adjacent to the diaphragm to the acoustic exit of the compression driver. Specifically, circumstances where internal passageways from the compression chamber to the acoustic exit need to be lengthened relative to passageways around the perimeter of the compression chamber.

BACKGROUND OF THE INVENTION

Audio reproduction and audio playback have used electrodynamic acoustic transducers known as compression drivers for more than 90 years. A central feature of compression drivers is an oscillating diaphragm placed adjacent to a boundary and affixed at its perimeter. Together the diaphragm and boundary form a small cavity known as a compression chamber. This chamber then exits via one or more passageways to an acoustic exit. The passageways between the compression chamber and the acoustic exit are commonly known as the phase plug. The acoustic exit is then connected to a mechanical volume which expands from entrance (throat) to exit (mouth). The expanding mechanical volume is commonly called a horn, waveguide, or acoustic transformer (U.S. Pat. No. 4,325,456A).

The necessary expansion of cross-sectional area, from the surface of the vibrating diaphragm, through the phase plug to the acoustic exit, and then to the horn mouth, is a consequence of physics. Air has much more compliance (i.e., less stiffness) than any solid diaphragm. This difference in stiffness represents an acoustic impedance mismatch which reduces coupling of energy from the vibrating diaphragm to the air adjacent the diaphragm. To maximize the coupling of energy from the diaphragm to the ambient environment, one would like to more closely match the stiffness of the diaphragm and air adjacent to the diaphragm. Then at the mouth of the horn, the compliance of air should match that of free space to facilitate sound radiation.

The smaller the confined volume of air, the higher its stiffness. Confining a small volume of air adjacent to the oscillating diaphragm therefore results in better impedance matching and energy coupling. The enduring approach to achieve better energy transfer is patented in 1929, with Thuras' "Electrodynamic device" (U.S. Pat. No. 1,707, 544A). Here a "stiff dish-shaped" concave vibrating diaphragm is clamped at its periphery within a "sound chamber." The diaphragm is then occluded with a "metallic plug" that allows acoustic vibrations to travel towards an acoustic exit from openings adjacent to the diaphragm. Thuras' metallic plug became known as a "phase plug" in modern compression driver terminology.

The purpose of Thuras' construction was to have the air adjacent to the diaphragm more closely match the stiffness of the diaphragm, and then to gradually transition to match the stiffness of free space. Numerous improvements have been made to this type of transducer over time. For example, compression drivers using annular diaphragms are disclosed as early as 1932 (U.S. Pat. No. 1,845,768). Compression drivers with convex dome diaphragms are disclosed as early as 1934 (U.S. Pat. Nos. 2,058,555A, 3,432,002).

The air in the cavity between the oscillating diaphragm and compression chamber wall boundary exhibits natural resonances, often within compression driver's desired frequency range of operation. The work of B. Smith (Ref 1) on suppression of acoustic cavity modes in a compression chamber bounded with flat, rigid diaphragm is the pioneering method for choosing where along the compression chamber sound should be allowed to enter the phase plug from the diaphragm for best evenness of acoustic response. Practical compression drivers almost never use flat diaphragms, as the additional stiffness of a domed structure tends to suppress unwanted diaphragm resonances. With the rise of computing power, numerical methods are now brought to bear on the analysis of sound propagation from the compression chamber to the acoustic exit.

Those skilled in the art commonly use phase plugs comprised of several concentric passageways that have smaller openings near the diaphragm and larger openings at the acoustic exit. The location of passageway openings adjacent to the diaphragm are selected to manage the resonances of the compression chamber and/or diaphragm. Optimizations for compression drivers have sought to reduce coupling of modal resonances, see e.g., U.S. Pat. No. 8,121,330B2 for dome diaphragms. As resonances cannot be fully avoided, those skilled in the art may reduce the physical dimensions of compression chambers, diaphragms, and phase plug passageways to raise the minimum frequency of onset for undesired modal behavior.

The phase plug passageways are typically multiple concentric rings, or a combination of concentric rings and radial slits. The passageways through the phase plug can be thought of as a collection of transmission lines. To avoid additional acoustic resonances caused by sound propagating differently through the phase plug's passageways, each path should be of similar length and acoustic impedance. For the case of concave diaphragms, a phase plug that provides equal length passageways is mechanically straightforward. The longest path lengths are naturally in the middle of the diaphragm, and any passageways from the diaphragm to the acoustic exit that originate near the perimeter of the compression chamber can be lengthened with geometry defined about the perimeter of the phase plug, or via the boundaries between nested parts. Creating geometry with longer path length at the perimeter of the phase plug therefore does not require manufacturing of phase plug assemblies with undercuts or complicated internal passageways.

Concave diaphragms have drawbacks when looking to produce the smallest possible compression driver. This is because the diaphragm is driven with an oscillating voice coil that moves in the flux of a magnetic motor structure. Modern compression drivers universally utilize permanent magnets to create flux in the motor. If the phase plug is to the inside of the voice coil, as is typical with concave domes, then the permanent magnet and magnetic flux path of the motor structure is usually placed outside of the diaphragm and voice coil assembly. This is to achieve sufficient magnetic flux in the motor, especially with smaller diameter voice coils. The location of the permanent magnet outside the voice coil diameter increases the overall outer dimensions of the motor structure and therefore the compression driver.

By contrast, use of a convex diaphragm allows placing the permanent magnet of the motor inside the voice coil. With the permanent magnet inside the voice coil, the amount the magnetic motor structure extends beyond the outer diameter of the voice coil may be reduced. The result is smaller overall outer dimensions for the compression driver. Smaller compression driver dimensions allow for transducers to be positioned more closely in applications where distance between multiple drivers is of importance. Example applications include acoustic beamforming and integration of multiple transducers on a single waveguide.

To accommodate the permanent magnet on the inside of the voice coil in a compact compression driver, the compression chamber and phase plug are now located on one side of the diaphragm and the magnet on the opposing side of the diaphragm. With this orientation of diaphragm, magnet, and phase plug, the preferred diaphragm curvature is now convex. This provides for a stiff diaphragm, physical space for the permanent magnet, and the shortest possible voice coil assembly. A long voice coil assembly adds additional moving mass and can otherwise impair compression driver output at high frequencies.

Use of a convex diaphragm changes the nature of the phase plug passageways. Unlike a concave diaphragm where the longest paths are at the center of the diaphragm, a convex diaphragm has the shortest path distance to the acoustic exit at the diaphragm center. For a concave diaphragm, extra passageway length is added to passageways around the phase plug perimeter; for a convex diaphragm, the extra passageway length is required in the middle of the phase plug and dome assembly, where the dome is the tallest. Convex diaphragms result in phase plugs where the required extra path length becomes a matter of internal geometry.

Internal geometry presents complication for manufacturing:

- near net-shape techniques, like 3D printing, can produce these geometries with a cost penalty for many applications;
- conventional injection molding or die casting techniques have limitations for producing parts with undercuts and internal geometry or require extremely expensive tooling;
- partitioning the geometry into segments (e.g., mold halves) has limitations for what geometry can be considered rotationally or for symmetry.

A novel design is therefore desired to produce phase plugs with path length extending passageways as internal geometry for use with compression drivers that have convex diaphragm assemblies, or where internal path length extension is otherwise required.

BRIEF SUMMARY

We present a novel phase plug design that is manufacturable with conventional mold-making approaches or by other near net-shape methods. The new design provides:

- flexible location of phase plug entrance locations within the compression chamber adjacent to the diaphragm;
- path length adjustment for each internal acoustic passageway;
- control of each passageway's expansion rate, and therefore acoustic impedance;
- acoustic exit physical shape compatible with existing designs;
- acoustic wavefront shape compatible with existing designs.

Unlike existing designs, the new phase plug provides for applications where path length through the interior of the phase plug is increased to match that of any perimeter phase plug passageways. Example use cases include compression drivers with convex diaphragms and transition of a circular acoustic source to one that creates a line shaped acoustic source.

For example, a phase plug is provided for an electrodynamic compression driver, including a compression chamber formed by an oscillating diaphragm and a boundary face of a phase plug assembly adjacent to the diaphragm, a singular acoustic exit defined by a termination of the phase plug assembly, one or more passageways which traverse through the phase plug assembly from the compression chamber to terminate at the acoustic exit, and an axis of rotation, defined within an interior of the phase plug assembly, that extends from the boundary face of the phase plug assembly at the compression chamber to the acoustic exit, where at least one of the passageways expands in cross sectional area between the respective entrance at the boundary face of the phase plug assembly, and the termination at the acoustic exit, while traversing through the phase plug, and where at least one of the internal passageways with the expanding cross section is rotated about the axis of rotation.

According to an exemplary embodiment, an axis of rotation for the diaphragm coincides with the axis rotation of the phase plug assembly.

In another exemplary embodiment, an axis of rotation for the diaphragm does not coincide with the axis rotation of the phase plug assembly.

In one embodiment, the expanding internal passageway is rotated in a manner that is spiral, conic spiral, or helical with respect to the axis of rotation.

According to an exemplary embodiment, a plurality of passageways about the axis of rotation are distributed in a rotationally symmetric manner.

While in another embodiment, a plurality of passageways about the axis of rotation are not distributed in a rotationally symmetric manner.

According to an exemplary embodiment, an outermost passageway is rotationally symmetric about the axis of rotation.

According to an exemplary embodiment, one or more inner passageways are disposed radially inward of the outermost passageway, each having an expanding cross sectional areas in a direction toward the acoustic exit, and each being rotated in a manner that is spiral, conic spiral, or helical with respect to the axis of rotation.

In another exemplary embodiment, the phase plug assembly includes an outermost component having an inner wall, a middle component having an outer surface and a hollow interior with channels formed at an inner wall of the hollow interior, and a third nested component having an outer face.

In still another embodiment, the middle component is received with in the outermost component to delimit the outermost passageway between the inner wall of the outermost component and the outer surface of the middle component.

Advantageously, the third nested component may be received within the hollow interior of the middle component to delimit the one or more inner passageways between the outer face of the third nested component and the channels of the inner wall of the middle component, In a preferred embodiment, a length of the outermost passageway is equivalent to a length of each of the one or more inner passageways.

BRIEF DESCRIPTION OF THE DRAWINGS

For a more complete understanding of this disclosure, reference is now made to the following brief description, taken in connection with the accompanying drawings and detailed description, wherein like reference numerals represent like parts, in which.

DETAILED DESCRIPTION

Figure 1:
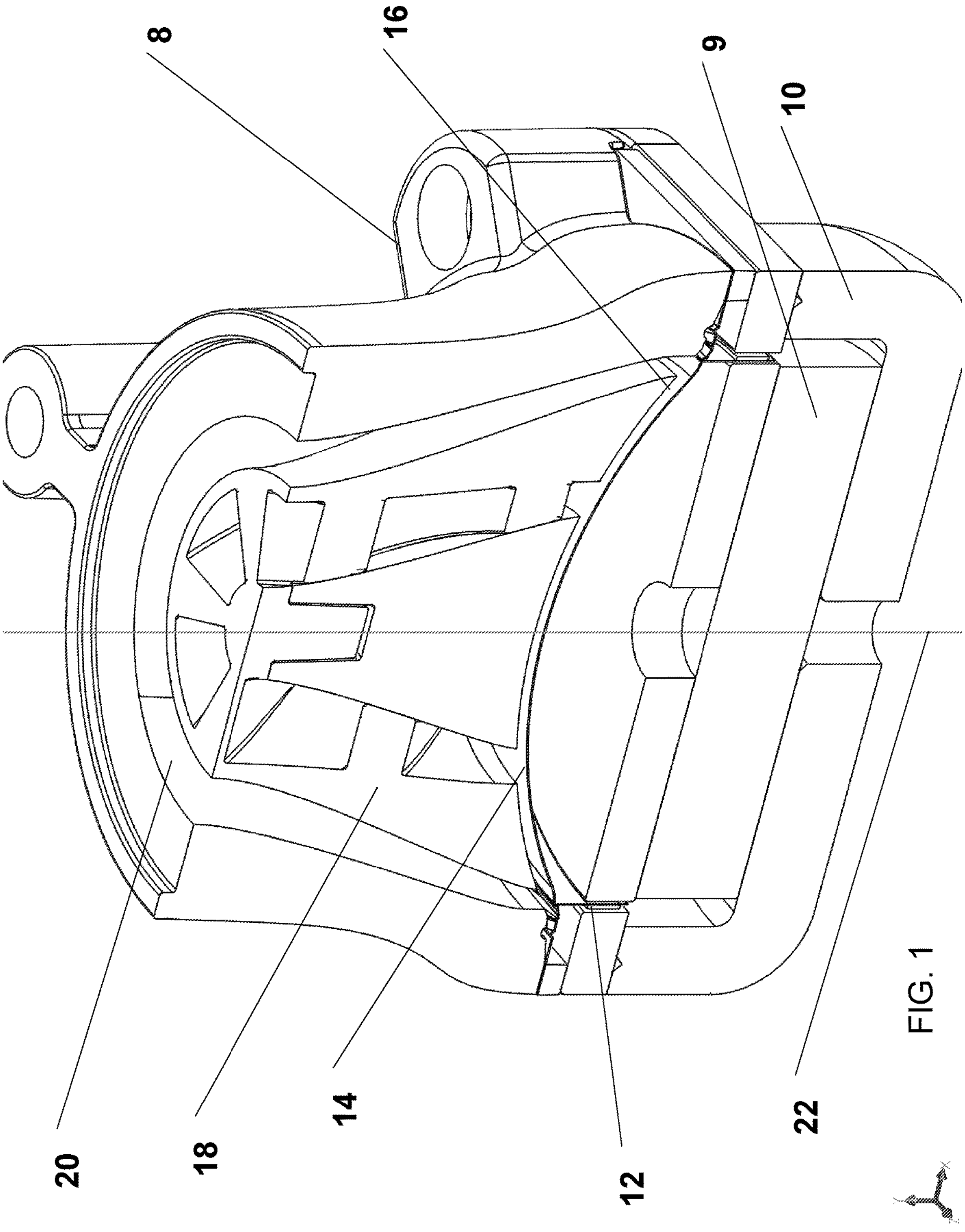
FIG. 1 is the section view of a physical embodiment of a compression driver 8 with the new phase plug assembly 18.

FIG. 1 is a cross-section through the middle of the compression driver 8 embodiment enumerating the major features including: the magnet 9, magnetic motor 10, voice coil 12, convex diaphragm 14, compression chamber cavity 16, phase plug assembly 18, acoustic exit 20, and axis of rotation 22 for the phase plug 18 and diaphragm 14.

Figure 2:
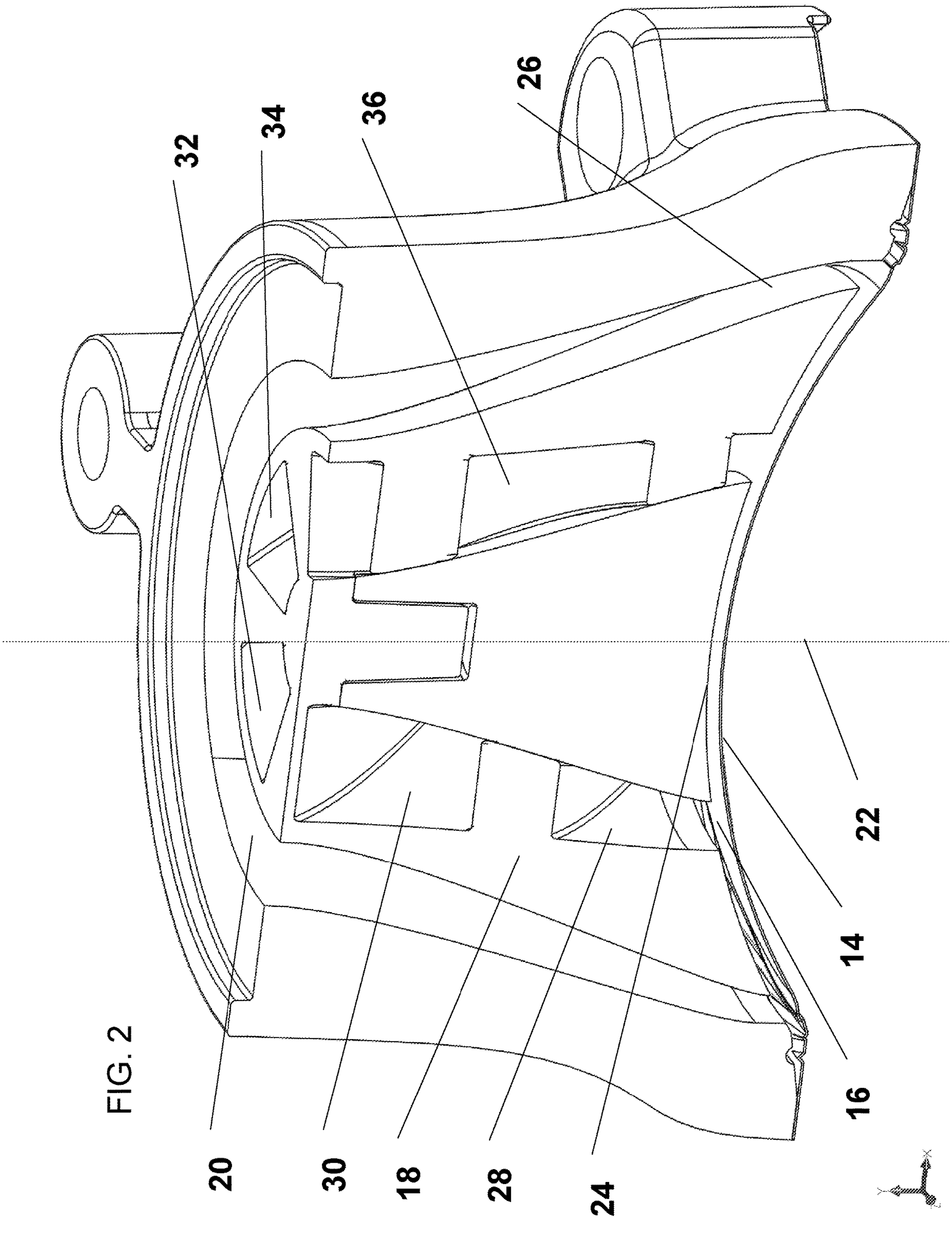
FIG. 2 is a similar cross-section to FIG. 1, but with features removed to focus on the details of the phase plug 18 between the diaphragm 14 and compression chamber 16 to the acoustic exit 20.

FIG. 2 highlights embodiment details between the compression chamber 16, and the acoustic exit 20. The compression chamber 16 is bounded by the diaphragm 14 and the boundary face 24 of the phase plug assembly 18. The embodiment provides the following features:

- Passageways (26, 28, 30, 32, 34, 36) beginning at the compression chamber 16, through the phase plug assembly 18, and defined beginning from the face 24 of the phase plug 18 (opposite the diaphragm 14), to the acoustic exit 20.
- A perimeter passageway 26 around the outside of the phase plug assembly 18 that begins on the boundary face 24 of the phase plug 18 facing the compression chamber 16.
- Passageways (28-36) rotated about the central axis 22 of the phase plug 18 to insure substantially equal path lengths at the acoustic exit 20 relative to the length of the perimeter passageway 26.
- The acoustic impedance of all passageways (26-36) is controlled by choice of the area expansion rate through the phase plug assembly 18 from the compression chamber 16 to the exit 20.
- The acoustic exit 20 is circular, a common configuration for compression drivers.
- The shape of the acoustic wavefront at the exit 20 may be defined as a plane wave or a wavefront with some curvature by varying the path length of the internal (28-36) passageways versus the perimeter passageway 26.

The embodiment is manufactured via conventional injection molding techniques, rather than other near-net shape techniques. To enable the molding process, this embodiment has equal length internal passageways (28-36) symmetrically distributed about the axis of rotation 22. Because of these choices in geometry, an internal mold slide assembly used to create the rotating passageways (28-36) can be pulled and rotated out of the mold, in the manner of a corkscrew.

The embodiment herein provides six passageways (26-36) from opposite the face of the diaphragm 14 to the acoustic exit 20. The outermost passageway 26 is rotationally symmetric about the axis of the phase plug and diaphragm 22. The inner five passageways (28-36) take the form of expanding area cross sections that are rotated about the axis of the phase plug 22, in the manner of a spiral. In this embodiment all five internal passageways (28-36) are rotated in the same manner and are distributed in a rotationally symmetric way around the axis of rotation 22.

Figure 3:
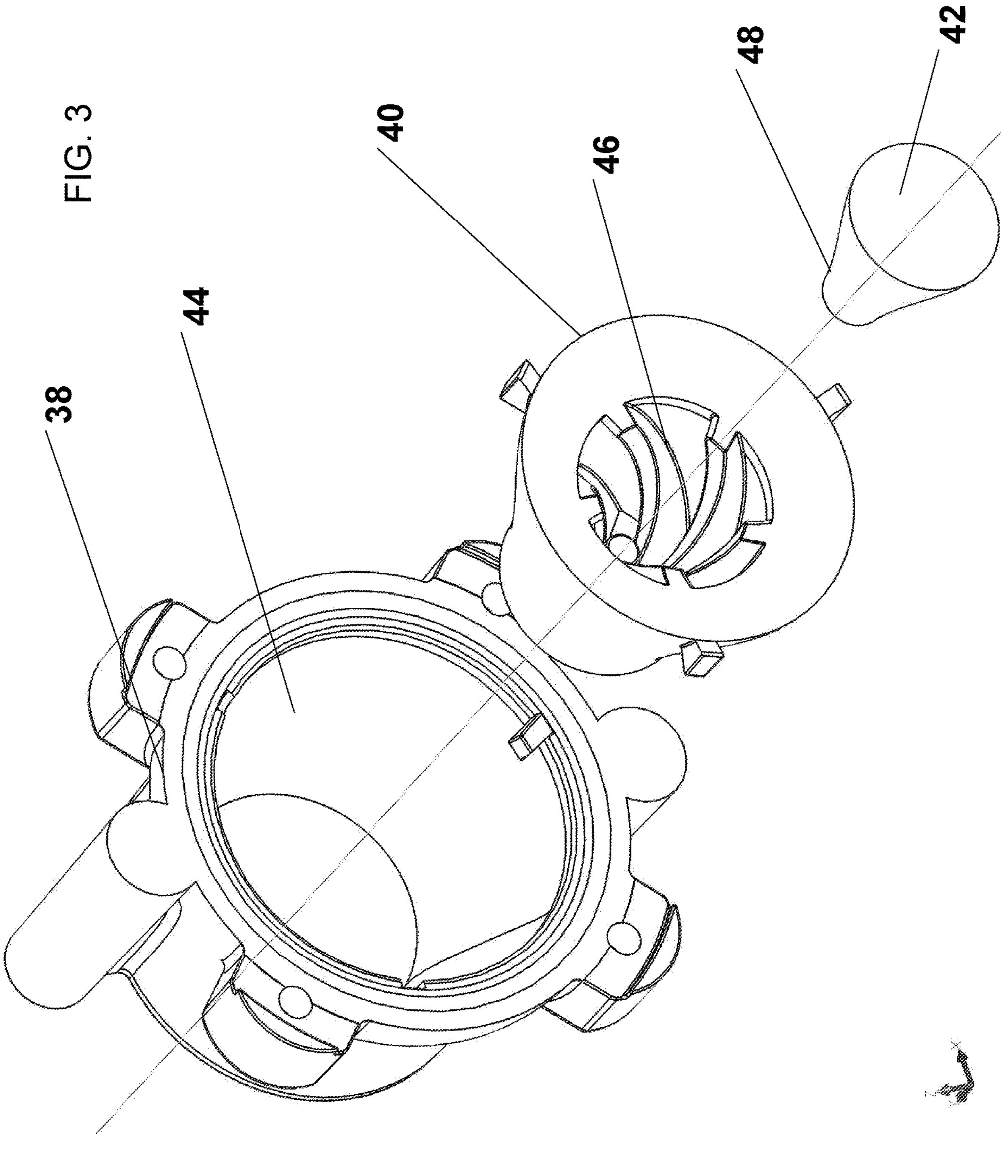
FIG. 3 is an exploded view of the nested components (38, 40, 42) that comprise the embodiment's phase plug assembly 18.

FIG. 3 is an exploded view, which demonstrates how the nested components (38, 40, 42) combine to form the phase plug assembly 18 and its passageways (26-36). The inner wall 44 of the outermost component 38 forms the outer wall boundary of the perimeter passageway 26 in FIG. 2. Similarly, the inner wall 46 of the middle component 40 forms the outer wall boundary of the five internal rotating passageways (28-36). Finally, the inner wall boundary of the five passageways (28-36) is defined by the outer face 48 of the third nested component 42. The components (38, 40, 42) are assembled concentrically to form the overall phase plug assembly 18 from FIG. 1. The result is a phase plug with complex internal geometry manufactured by conventional molding techniques.

The outermost component 38 is an annular member shaped and sized accordingly to receive the middle component 40 at an interior of the outermost component 38. The middle component 40 is a frustoconical shaped element having an outer surface which, along with the inner wall 44 of the outermost component 38, delimits the internal passageway 26 when the middle component 40 is disposed at the interior of the outermost component 38. The middle component 40 has a plurality of openings at a narrow end of its frustoconical shape. The middle component 40 has a hollow interior that opens at a wider end of the frustoconical shape and which is delimited by the inner wall 46 where the hollow interior is configured to receive the third nested component 42. The inner wall 46 is comprised of a plurality of channels which open to the hollow interior and which, along with the outer face 48 of the third nested component 42, form the spiraling internal passageways 28-36 when the third nested component 42 is disposed within the hollow interior of the middle component 40. The plurality of channels extend to the openings at the narrow end of the middle component 40 such that the internal passageways 28-36, formed by the inserted third nested component 42, also extend to the openings. The third nested component 42 is a frustoconical shaped solid element that is received in a friction fit within the hollow interior of the middle component 40 and/or is secured via an adhesive. The third nested component 42 may include a mating portion at a narrow end thereof for facilitating a connection to the middle component 40 at a corresponding mating portion thereof located in the hollow interior of the middle component 40. This engagement of the third nested portion 42 and the middle component 40, can be seen for example in FIGS. 1-2.

While the components in the phase plug 18 and diaphragm 14 of this embodiment are rotationally symmetric about a mutual axis 22, this embodiment should not be construed to prevent designs that deviate from mutual rotational symmetry, nor coincident axes of rotation. Deviations from alignment and symmetry can be useful in distributing or damping modal behavior within the compression chamber 16 or phase plug 18. Further, while this embodiment's path length and acoustic impedance of internal passageways is matched for each passageway (26-36), this should not be construed to prevent designs that deviate from these matching choices. Also, by way of example, the disclosed embodiment includes five internal passageways (28-36) having equivalent path length, volume, and expanding geometries. Other embodiments may include more or less than five internal passageways. Additionally, path length, volume, and/or geometry may vary from one internal passageway to another.

Various embodiments of the present invention are described herein with reference to the related drawings. Alternative embodiments can be devised without departing from the scope of this invention. It is noted that various connections and positional relationships. (e.g., over, below, adjacent, etc.) are set forth between elements in the description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. Terms such as "connected to", "affixed to", etc., can include both an indirect "connection" and a direct "connection."

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

REFERENCES

Ref 1—B. H. Smith, "An Investigation of the Air Chamber of Horn Type Loudspeakers," J Acoust Soc Am, vol. 25, no. 2, pp. 305-312, March 1953.

What is claimed:

1. A phase plug for an electrodynamic compression driver, comprising:

a. a compression chamber formed by an oscillating dome-shaped diaphragm and a boundary face of a phase plug assembly adjacent to the diaphragm, the boundary face having a shape complementary to a convex surface of the diaphragm;

b. a singular acoustic exit defined by a termination of the phase plug assembly;

c. an inner acoustic passageway and an outermost acoustic passageway which each traverse through the phase plug assembly from an entrance at the compression chamber to a termination at the acoustic exit; and d. an axis of rotation, defined within an interior of the phase plug assembly, that extends from the boundary face of the phase plug assembly at the compression chamber to the acoustic exit;

e. wherein the inner and outermost acoustic passageways expand in cross sectional area between the respective entrance at the boundary face of the phase plug assembly, and the termination at the acoustic exit, while traversing through the phase plug; and f. wherein the inner acoustic passageway is rotated symmetrically about the axis of rotation in a manner that is spiral, conic spiral, or helical with respect to the axis of rotation;

g. wherein the outermost acoustic passageway is rotationally symmetric about the axis of rotation and is disposed radially outward of the inner acoustic passageway;

h. wherein lengths of each of the inner and outermost acoustic passageways, as defined by a total distance along a path traced by a passageway from the boundary face of the phase plug to the acoustic exit, are similar;

i. wherein the entrances of the inner and outermost acoustic passageways are disposed at modes of the compression chamber to reduce resonances of the compression chamber;

j. wherein a rate of expansion of the cross sectional area of the inner and outermost acoustic passageways is similar, so as to form respective acoustic impedances at the termination of the inner and outermost acoustic passageways where said acoustic impedances are similar; and k. wherein the phase plug is axis-symmetric with respect to the axis of rotation.

2. The phase plug of claim 1, wherein the phase plug assembly comprises an outermost component having an inner wall, a middle component having an outer surface and a hollow interior with channels formed at an inner wall of the hollow interior, and a third nested component having an outer face.

3. The phase plug of claim 2, wherein the middle component is received with in the outermost component to delimit the outermost passageway between the inner wall of the outermost component and the outer surface of the middle component.

4. The phase plug of claim 3, wherein the third nested component is received within the hollow interior of the middle component to delimit the one or more inner passageways between the outer face of the third nested component and the channels of the inner wall of the middle component.

5. The phase plug of claim 1, wherein the inner acoustic passageway comprises a plurality of channels.

6. The phase plug of claim 5, wherein the plurality of channels comprises five channels.

* * * * *